United States Patent [19]

Lord et al.

[11] Patent Number: 5,299,594
[45] Date of Patent: Apr. 5, 1994

[54] LIQUID FLOW RATE DETECTOR

[75] Inventors: John J. Lord, Springfield; Wesley J. Bachman, Auburn, both of Ill.; David M. Beams, Fort Atkinson, Wis.

[73] Assignee: C.A.P., Inc., Benson, Minn.

[21] Appl. No.: 937,215

[22] Filed: Aug. 27, 1992

[51] Int. Cl.$^5$ ............................................. G05D 11/13
[52] U.S. Cl. .............................. 137/101.19; 137/114; 340/608
[58] Field of Search .......................... 137/114, 101.19; 340/606, 608; 417/1

[56] References Cited

U.S. PATENT DOCUMENTS

| | | | |
|---|---|---|---|
| 2,798,215 | 7/1957 | Domingo et al. | 340/606 |
| 2,926,684 | 3/1960 | Replogle | 137/101.19 |
| 3,196,679 | 7/1965 | Howland | 340/606 X |
| 3,366,942 | 1/1968 | Deane | 340/608 |
| 4,311,047 | 1/1982 | Hubbard | 340/608 X |
| 4,436,487 | 3/1984 | Purvis et al. | 137/114 X |
| 4,480,467 | 11/1984 | Harter et al. | 340/606 X |
| 4,573,802 | 3/1986 | Kerrigan et al. | 137/101.19 X |
| 4,642,614 | 2/1987 | Cook | 340/608 |

Primary Examiner—Stephen M. Hepperle
Attorney, Agent, or Firm—William L. Huebsch

[57] ABSTRACT

A liquid flow rate detector adapted for detecting whether a rate of flow for liquid flowing through a conduit is above or below a generally predetermined liquid flow rate, and for developing different control signals in response to detecting flow rates above and below that generally predetermined liquid flow rate. The detector includes first and second thermally conductive liquid contact members supported for contact with the flowing liquid; and electric circuitry that detects the ambient temperature of the flowing liquid through the first probe, supplies a limited amount of heat in an attempt to heat the second liquid contact member to a threshold temperature above that ambient temperature, detects the temperature of said second liquid contact member, generates a first control signal when the temperature of the second liquid contact member is at least at the threshold temperature to detect a liquid flow rate below the predetermined liquid flow rate at which the flowing liquid is not capable of cooling the second liquid contact member below the threshold temperature, and generates a second signal when the temperature of the second liquid contact member is maintained below the threshold temperature to detect a liquid flow rate above the predetermined liquid flow rate at which the flowing liquid is capable of cooling the second liquid contact member below the threshold temperature.

12 Claims, 4 Drawing Sheets

LIQUID FLOW RATE DETECTOR

TECHNICAL FIELD

This invention relates to liquid flow rate detectors, and in particular, to liquid flow rate detectors used to measure a rate of liquid flow through a conduit and to activate or deactivate a system injecting a substance into the conduit at predetermines rates of liquid flow in the conduit.

BACKGROUND

A metered amount of foam concentrate can be injected into a conduit such as a pipe or hose through which water to be used in fighting a fire is flowing so that a foam can result from the water and concentrate mixture that will much more efficiently extinguish the fire than water alone. It is desirable that such concentrate only be injected into the water when the water is flowing above a predetermined rate through the conduit, that the concentrate is injected within seconds after water flow through the conduit reaches that predetermined rate which affords minimizing the amount of water that will be directed at certain types of fires, and that the injection be terminated within seconds after flow through the conduit drops below that predetermined rate which minimizes the amount of foam concentrate used and insures that the concentrate will not flow in the wrong direction along the conduit to potentially contaminate an adjacent pumping system for the water.

Manual activation and deactivation of the injection system is impractical as it presents too many opportunities for operator error. Thus it is desirable to use an automatic activation and deactivation system including a flow rate detector that activates or deactivates the injection system at the appropriate times. Impeller or paddle switches are not suitable as the flow rate detector in such systems, however, because solid particles such as sand and small rocks carried by the water flowing through the conduit can damage or wear down the portions of the impeller or paddle switch exposed to the water flow. While ultrasonic doppler sensors or deferential pressure sensors could possibly be used as the flow rate detectors in such systems, neither of these sensors would be practical or cost effective for the application described above.

DISCLOSURE OF THE INVENTION

The present invention provides a rugged, reliable and cost effective liquid flow rate detector adapted for detecting whether a rate of flow for liquid flowing through a conduit is above or below a generally predetermined liquid flow rate, and for developing different control signals in response to detecting flow rates above and below the generally predetermined liquid flow rate. The flow rate detector is particularly useful for detecting the flow rate of water through a conduit used in fighting a fire and properly activating and deactivating a system for injecting a foam concentrate into that conduit so that a foam can result from the water and concentrate mixture that will much more efficiently extinguish the fire than water alone.

According to the present invention there is provided a liquid flow rate detector comprising (1) first and second thermally conductive liquid contact members; (2) means adapted for supporting the liquid contact members in contact with the flowing liquid; and (3) an electric circuit comprising (a) ambient liquid temperature sensing means coupled to the first liquid contact member for detecting the ambient temperature of flowing liquid with which the first liquid contact members is in contact; (b) heating means including an electric heater for supplying a limited amount of heat in an attempt to heat the second liquid contact member to a threshold temperature at least a predetermined number of degrees above the ambient temperature of the liquid determined by the ambient liquid temperature sensing means; (c) heated liquid contact member temperature sensing means for detecting the temperature of the second liquid contact member; and (d) first and second signal generating means for generating a first control signal when the temperature of the second liquid contact member is at least at the threshold temperature to detect a liquid flow rate below the predetermined liquid flow rate at which the flowing liquid is not capable of cooling the second liquid contact member below the threshold temperature, and for generating a second signal when the temperature of the second liquid contact member is maintained below the threshold temperature by the flowing liquid to detect a liquid flow rate above the predetermined liquid flow rate at which the flowing liquid is capable of cooling the second liquid contact member below the threshold temperature.

The first and second thermally conductive liquid contact members of the liquid flow rate detector can be metal probes, and the means adapted for supporting the liquid contact members can engage proximal end portions of the probes with distal end portions of the probes projecting therefrom in a position adapted to be immersed in the flowing liquid. When such probes are used, the means adapted for supporting the liquid contact members or probes can include a housing having a threaded part adapted for use with a conduit including a conventional pipe tee by engaging the threaded part in the pipe tee with the distal ends of the probes projecting from an inner end portion of the housing into the conduit; or can include a housing from which the probes project adapted for use with a rigid conduit having openings along one side adapted to receive the distal end portions of the probes and a gasket around the probes for sealing engagement between the housing assembly and the conduit with the housing assembly being clamped against the conduit in the manner of a conventional saddle valve.

Alternatively, the means adapted for supporting the liquid contact members in the liquid flow rate detector can comprise a thermally non conductive member having a surface defining a through passageway, and means adapted for connecting the flow rate detector between portions of the conduit with that through passageway aligned with passageways in the conduit portions, and the liquid contact members can be attached in spaced relationship along the surface of the thermally non conductive member defining that through passageway for contact with liquid flowing through that passageway.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
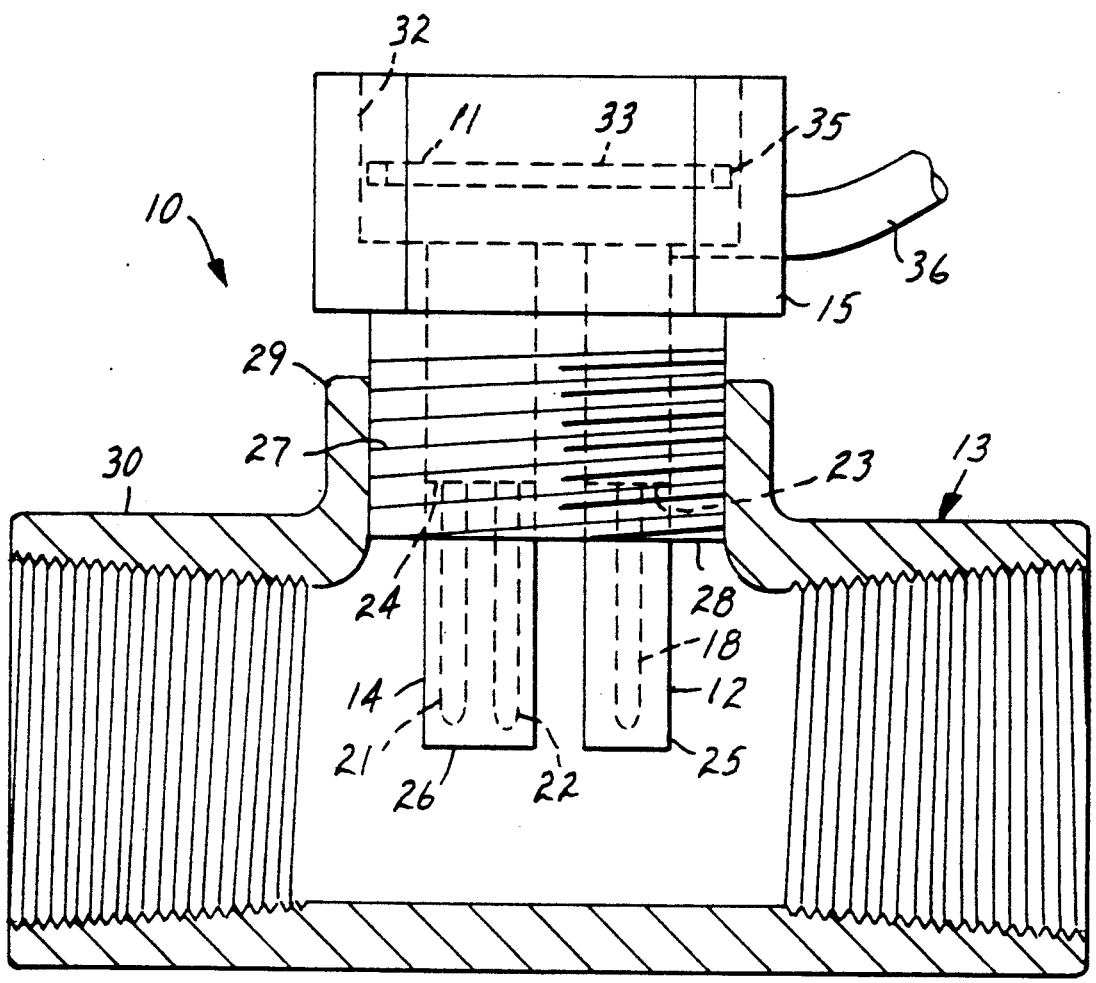
FIG. 1 is side view of a first embodiment of a liquid flow rate detector according to the present invention shown engaged with a pipe tee shown in longitudinal section that could be a portion of a conduit portion in which liquid flow rate is to be detected by the liquid flow rate detector.
Figure 2:
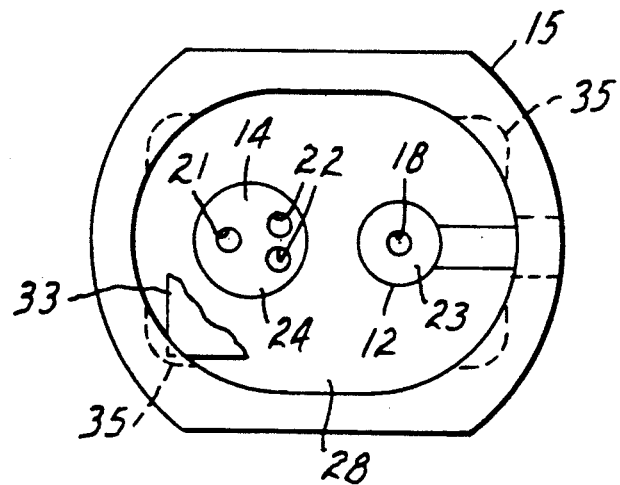
FIG. 2 is a top view of the liquid flow rate detector from which portions have been removed or broken away to show details of a housing and probes included therein.
Figure 3:
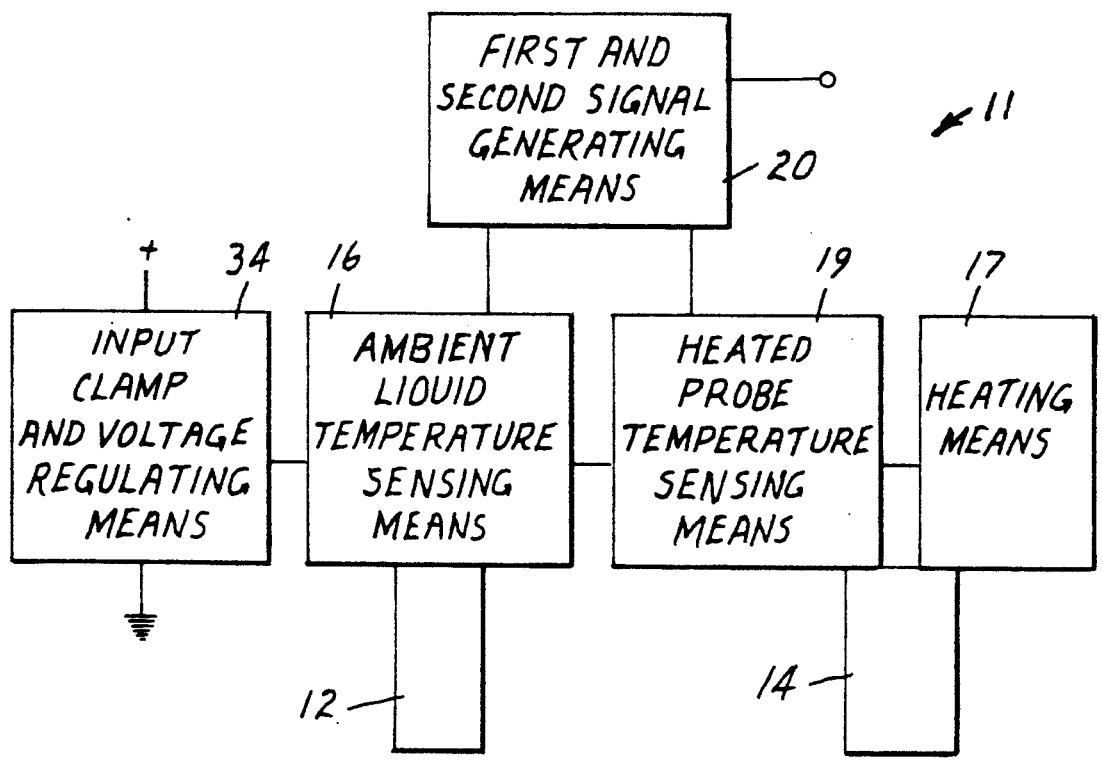
FIG. 3 is a block diagram of electronic circuitry in the liquid flow rate detector of FIG. 1.

Referring now to FIGS. 1 and 2 of the drawing there is shown a first embodiment of a liquid flow rate detector 10 according to the present invention including electrical circuitry 11 for which a block diagram is provided in FIG. 3. The liquid flow rate detector 10 is adapted for detecting whether a rate of flow for liquid flowing through a conduit 13 is above or below a generally predetermined liquid flow rate, and for developing different control signals in response to detecting flow rates above and below the generally predetermined liquid flow rate. The flow rate detector 10 is particularly useful for detecting flow of water through a conduit 13 used in fighting a fire and for properly activating and deactivating a system for injecting a foam concentrate into that conduit 13 so that a foam can result from the water and concentrate mixture that will much more efficiently extinguish the fire than water alone.

Generally, the liquid flow rate detector 10 comprises (1) first and second thermally conductive liquid contact members or probes 12 and 14 (see FIGS. 1 and 2); (2) means including a housing 15 adapted for supporting the probes 12 and 14 in contact with the flowing liquid; and (3) the electrical circuit 11 (see FIG. 3) which comprises (a) an ambient liquid temperature sensing circuit portion or means 16 coupled to the first probe 12 for detecting the ambient temperature of flowing liquid with which the first probe 12 is in contact; (b) a heating circuit portion or means 17 including an electric heater 9 for supplying a limited amount of heat in an attempt to heat the second or heated probe 14 to a threshold temperature at least a predetermined number of degrees above the ambient temperature of the liquid determined by the ambient liquid temperature sensing circuit portion or means 16; (c) a second or heated probe 14 temperature sensing circuit portion or means 19 for detecting the temperature of the second probe 14; and (d) a first and second signal generating circuit portion or means 20 for generating a first control signal when the temperature of the second or heated probe 14 is at least at the threshold temperature to detect a liquid flow rate below the predetermined liquid flow rate at which the flowing liquid is not capable of cooling the second probe 14 below the threshold temperature, and for generating a second signal when the temperature of the second or heated probe 14 is maintained below the threshold temperature by the flowing liquid to detect a liquid flow rate above the predetermined liquid flow rate at which the flowing liquid is capable of cooling the second or heated probe 14 below the threshold temperature.

The first and second thermally conductive liquid contact members or probes 12 and 14 of the liquid flow rate detector 10 are of metal (e.g., a cylindrical aluminum first probe 12 1.5 inches long, 0.4 inch in diameter with a 0.196 diameter central bore 18 opening through its proximal end 23, and a cylindrical aluminum second probe 14 1.5 inches long, 0.675 inch in diameter with one 0.196 diameter bore 21 and two 0.238 inch bores 22 all opening through its proximal end 24). The means adapted for supporting the probes 12 and 14 comprises a bottom wall 28 of the housing 15 which is of a relatively non thermally conductive polymeric material (e.g., "Nylatron" available from Cadillac Plastics, Peoria, Ill.). The proximal end portions 23 and 24 of the probes 12 and 14 are externally threaded and are threadably engaged in the bottom wall 28 while distal end portions 25 and 26 of the axially parallel probes 12 and 14 project from the outer surface of the bottom wall 22 in a position adapted to be immersed in the flowing liquid. The housing 15 has a threaded part 27 (e.g., 1.5 inch 11.5 NPT) at one end about its axis, which threaded part 27 is adapted for threaded engagement with a threaded part 29 around an opening in a conventional pipe tee 30 included in the conduit 13 with the distal ends of the probes 12 and 14 projecting from the then inner end portion of the housing 15 assembly into the passageway through the pipe tee 30 and conduit 13. The housing 15 has a socket 32 opening through its end opposite its bottom wall 28 in which a major portion of the circuitry 11 is retained by being mounted on a circuit board 33, which circuit board 33 is supported in the housing 15 by having its corners retained in recesses 35 from the socket 32. The circuitry 11 and circuit board 33 are potted in the socket by a conventional potting material (e.g., Thermoset 300), and a power inlet and signal outlet cord 36 connected to the circuitry 11 extends through an opening in the side wall of the housing 15.

As is illustrated in FIG. 3, the circuitry 11 also generally incudes an input clamp and voltage regulation circuit portion or means 34 for protecting the rest of the circuity 11 from over voltage, reverse polarity, and general noise that can be generated on a vehicles 12 volt electrical system by which the liquid flow rate detector 10 is typically adapted to be powered through the cord 36.

Figure 4:
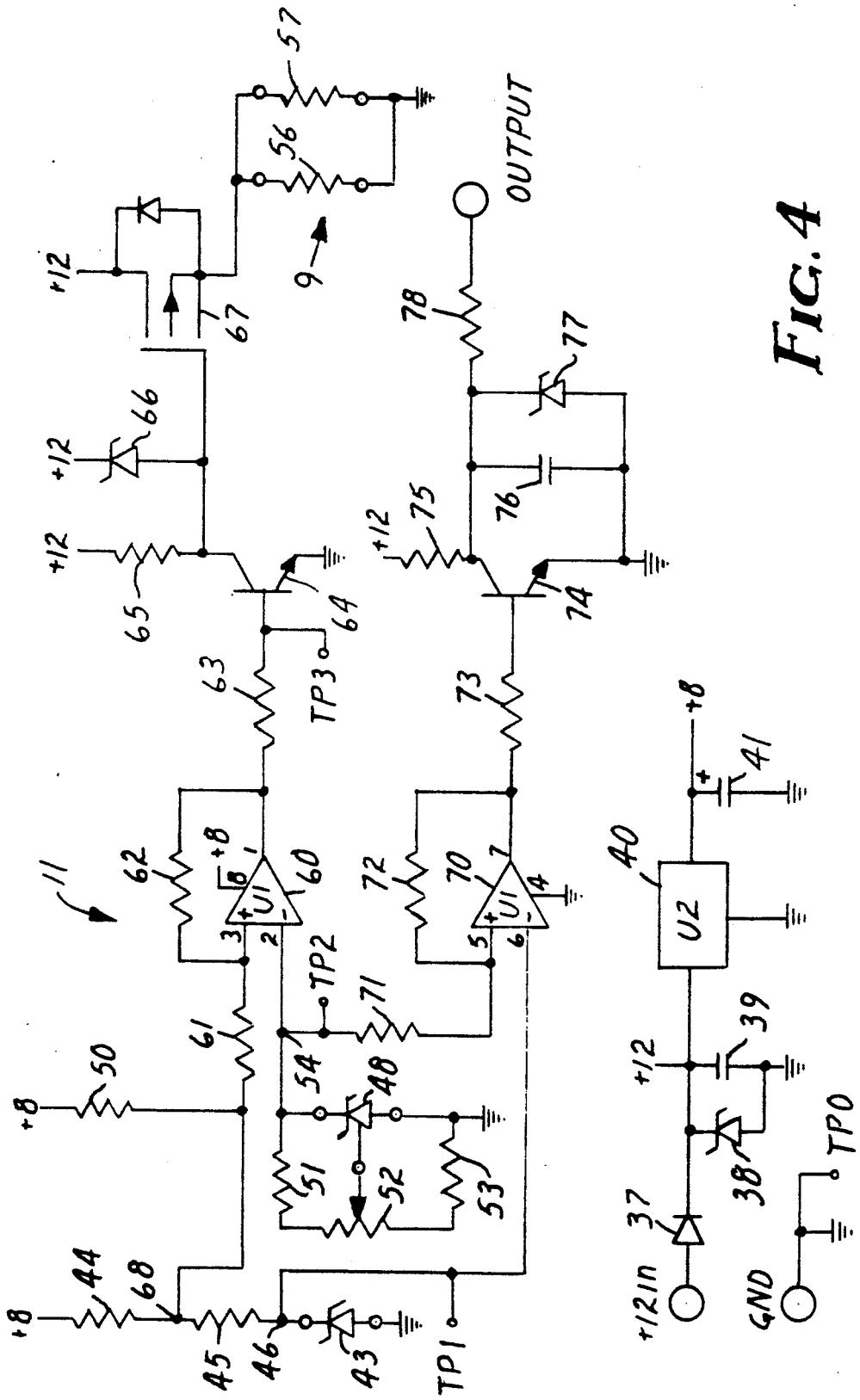
FIG. 4 is an electrical schematic diagram corresponding to the block diagram of FIG. 3.

As is best seen in the electrical schematic for the circuitry 11 illustrated in FIG. 4, the input clamp and voltage regulation circuitry portion or means 34 includes a blocking diode 37 (e.g., a generic 1N404) which provides reverse polarity protection, a power zener diode 38 (e.g., a MR2535 available from Motorola Inc., Schaumburg Center, Ill.) which provides over voltage protection, a filter capacitor 39 (e.g., a generic 0.1 uF 50 volt ceramic) which provides protection from high frequency noise, a series voltage regulator 40 (e.g., a generic LM2930-8) which provides stable and regulated power to the rest of the circuitry 11 regardless of the voltage fluctuations occurring on vehicles electrical systems, and a filter capacitor 41 (e.g., a generic 10 uF 10 volt tantalum) which provides an internal buffer to improve the transient response of the voltage regulating capacitor 39 to the power demands of the circuitry 11.

As is seen in FIG. 4, the ambient liquid temperature sensing means or portion 16 of the circuit 11 coupled to the first probe 12 for detecting the ambient temperature of flowing liquid with which the first probe 12 is in contact comprises an integrated circuit temperature sensor 43 (e.g., a generic LM335Z) positioned in the bore 18 in the first probe 12 and in good thermal contact with the first probe 12 through thermal contact grease in the bore 18 between the sensor 43 and the first probe 12, and a resistor 44 (e.g., a generic 3.92K 1% metal film) and a resistor 45 (e.g., a typical generic 15.8 ohm 1% metal film) which provide a source of current through the temperature sensor 43. The temperature sensor 43 produces a voltage at a node 46 proportional to 10 millivolts (mV) per degree Kelvin and referenced to 2.98 volts at 25 degrees Celsius. Since the temperature of the liquid being detected can vary anywhere between freezing and boiling, the first or reference probe 12 establishes a reference temperature for other portions of the circuitry 11.

The heated probe 14 temperature sensing means or portion 19 of the circuit 11 for detecting the temperature of the second probe 14 comprises an integrated circuit temperature sensor 48 (e.g., a generic LM335Z) positioned in the bore 21 in the second probe 14 and in good thermal contact with the second probe 14 through thermal contact grease in the bore 21 between the sensor 48 and the second probe 14, a resistor 50 (e.g., a generic 3.9K 5% metal film) that provides a current source, and a resistor 51 (e.g., a generic 10K 5% metal film), a potentiometer 52 (e.g., a generic 2K-10 turn), and a resistor 53 (e.g., a generic 7.5K 5% metal film) that provide a temperature offset/adjustment part of the circuit portion 19. The potentiometer 52 is adjusted with the sensors 43 and 48 in the probes 12 and 14 at the same equilibrium temperature and the heater 9 disabled so that a differential voltage of −15 millivolts will be produced between the node 46 and a node 54 which differential voltage corresponds to approximately +1.5 degree Celsius.

The electric heater 9 in the heating means or portion 17 of the circuit 11 comprises two power resistors 56 and 57 (generic 47 ohm 4W wire wound), each positioned in a different one of the bores 22 in the probe 14, and in good thermal contact with the probe 14 through thermal contact grease in the bore 22 between the resistors 56 and 57 and the probe 14. In addition to the resistors 56 and 57, the heating means or portion 17 of the circuit 11 for supplying a limited amount of heat in an attempt to heat the second or heated probe 14 to a threshold temperature at least a predetermined number of degrees above the ambient temperature of the liquid contacting the first probe 12 includes one half of an integrated circuit precision dual operational amplifier 60 (e.g., a TLC272IN available from Texas Instruments Inc., Dallas, Tex.), a positive feedback and hysteresis circuit part formed by a resistor 61 (e.g., a generic 1K 5% metal film) and a resistor 62 (e.g., a generic 4.7M 5% metal film), a current limiting resistor 63 (e.g., a generic 10K 5% metal film), an inverting buffer NPN transistor 64 (e.g., a generic 2N3904), a current limiting resistor 65 (e.g., a generic 10K 5% metal film) a gate protecting zener diode 66 (e.g., a generic 1N5248A), and a power P channel field effect transistor 67 (e.g., a IRF9523 available from International Rectifier Corp., El Segundo, Calif. or its generic equivalent). This circuit portion 17 attempts to maintain the temperature sensor 48 in the probe 14 warmer than the first reference temperature sensor 43 in the probe 12 in an attempt to reduce the voltage differential between a node 68 and the node 54 to 0.000 volts. The positive temperature offset is created and set by the voltage drop across the resistor 45. With the values illustrated in FIG. 4, the circuit portion 17 will attempt to keep the heated probe 14 warmer by 2 degrees Celsius than the first probe 12. The amount of current available to the heating resistors 56 and 57 from the circuitry portion 17 and the thermal gradient characteristics of the metal probe 12 have been selected to only allow this temperature differential to be obtained within a predetermined range of heat transfer caused by liquid flow past the heated probe 14. Upon the first application of power to this circuitry portion 17, given that the sensors 43 and 48 in the probes 12 and 14 are at the same equilibrium temperature and the potentiometer 52 is adjusted to produce a −15 mV differential between the nodes 46 and 54, the voltage differential between the nodes 46 and 68 will be −35 mV. This in turn will cause the operational amplifier 60, acting as a voltage comparator, to produce a positive output that turns on the transistor 64 which in turn will turn on the field effect transistor 67 allowing current to flow into the heater power resistors 56 and 57 thereby heating the temperature sensor 48 through the probe 14 and gradually raising the voltage at the node 54. When the node 54 reaches the same voltage as the node 68 plus approximately 1 mV (hysteresis), the operational amplifier 60, acting as a voltage comparator, will produce a negative output turning off the transistor 64 which in turn will turn off the field effect transistor 67 terminating the current flow through heater power resistors 56 and 57. Due to thermal lag, the temperature sensed at the temperature sensor 48 in the probe 14 will continue to rise slightly above the set point established by the resistor 45, and then begin to fall to a point at which the voltage differential between nodes 68 and 54 will be less than −1 mV (hysteresis), thereby starting the heating cycle over again.

The first and second signal generating means or portion 20 of the circuit 11 includes one half of an integrated circuit precision dual operational amplifier 70 (e.g., a TLC272 available from Texas Instruments, Inc., Dallas, Tex.), and a resistor 71 (e.g., a generic 1K 5% metal film) and a resistor 72 (e.g., a generic 4.7M 5% metal film) that provide a positive feedback and hysteresis circuit part. Also included are a current limiting resistor 73 (e.g., a generic 10K 5% metal film), an inverting buffer NPN transistor 74 (e.g., a generic 2N2222), an optional pullup resistor 75 (e.g., a generic 10K 5% metal film), an output protecting capacitor 76 (e.g., a generic 0.1uf 50 volt ceramic), a zener diode 77 (e.g., a generic 1N5248A), and a current limiting resistor 78 (e.g., a generic 220 ohm ¼ watt carbon composition) which control the output of and buffer the circuit portion 20. Upon the first application of power to this circuitry, given that both of the sensors 43 and 48 in the probes 12 and 14 are at the same equilibrium temperature and the potentiometer 52 is adjusted to produce a +15 mV differential between nodes 46 and 54 with the heater disabled, the voltage differential between nodes 46 and 54 will initially be −15 mV. This in turn will cause the operational amplifier 70, acting as a voltage comparator, to produce a negative output. Once the heating resistors 56 and 57 warm the probe 14 and thereby the sensor 48 so that the voltage between nodes 46 and 54 is greater than 1 mV (hysteresis) above 0 volts, the output of operational amplifier 70 will swing positive. This output will remain positive as long as heat output from the heating resistors 56 and 57 is able to keep the probe 14 and thereby the temperature sensor 48 1.5 degrees Celsius warmer than the reference sensor 43 in the probe 12. If the heat output of the heating resistors 56 and 57 is exceeded by the heat loss from the probe 14 into the liquid flowing around the probe 14, the temperature of the sensor 48 will drop, causing the voltage deferential between nodes 46 and 54 to drop −1 mV (hysteresis) below 0 volts, thereby causing the output to go negative and indicating that a predetermined flow rate has been exceeded. The output of the circuit portion 20 is inverted. When a predetermined flow rate has been exceeded, the output goes positive, thereby enabling an external device such as an injection pump. Conversely when the flow diminishes below the predetermined rate, the output goes low, thereby disabling the external device.

The liquid flow rate detector 10 described above with reference to FIGS. 1 and 2 having probes 12 and 14 of the size given in the examples and in which the circuit 11 is that described above with reference to FIG. 4 in which the example components are used has been found to reliably detect whether a rate of flow for liquid flowing through a 1 and ½ inch pipe is above or below a generally predetermined liquid flow rate in the range of about 5 to 10 gallons per minute (e.g., e.g., will detect whether the flow of water through a fire hose is turned on in which case the flow rate could, for example, be around 95 gallons per minute, or is turned off in which case the flow rate could be less than 1 gallon per minute and as little as 0 gallons per minute), and for developing different control signals in response to detecting flow rates above and below that generally predetermined liquid flow rate.

Figure 5:
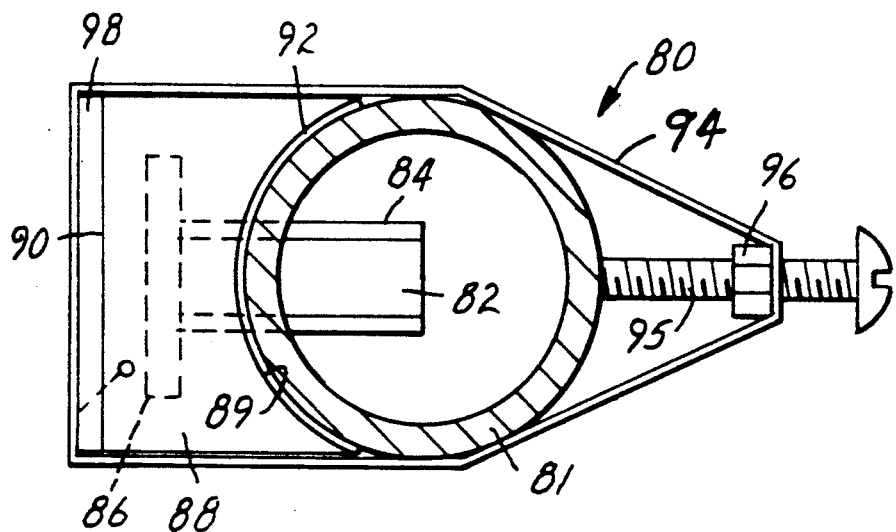
FIG. 5 is an end view of a second embodiment of a liquid flow rate detector according to the present invention shown attached to a conduit in which liquid flow rate is to be detected by the liquid flow rate detector.

Referring now to FIG. 5 there is illustrated a second embodiment of a liquid flow rate detector 80 according to the present invention adapted for detecting whether a rate of flow for liquid flowing through a conduit 81 is above or below a generally predetermined liquid flow rate, and for developing different control signals in response to detecting flow rates above and below that generally predetermined liquid flow rate. The flow rate detector 80 comprises first and second thermally conductive liquid contact members or metal probes 82 and 84 similar to the probes 12 and 14 described above, means adapted for supporting the liquid contact members 82 and 84 for contact with the flowing liquid, and electric circuitry 86 that is essentially the same as the electrical circuitry 11 described above. The liquid flow rate detector 80 is adapted for use with the conduit 81 which has through openings along one side adapted to receive the distal end portions of the probes 82 and 84. The means adapted for supporting the liquid contact members or probes 82 and 84 comprises a housing 88 having inner and outer sides 89 and 90. The housing is formed of an epoxy potting material. Proximal end portions of the probes 82 and 84 are engaged by the housing by being potted therein and distal end portions of the probes 82 and 84 project generally normally from the inner side 89 of the housing 88. At least a major portion of the electric circuitry is enclosed within the housing 88. A gasket 92 extends around the probes 82 and 84 along the inner side 89 of the housing 88 and is adapted for sealing engagement between the inner side 89 of the housing 88 and the conduit 81. Means are provided for clamping the housing 88 to the conduit to bring the gasket 92 into sealing engagement between the conduit 81 and the housing 88 around the probes 82 and 84 by a continuous strap 94 extending around the housing 88 and conduit 81 and a bolt 95 passing through an opening on the side of the strap 94 opposite the housing 88 and through a nut 96 along the surface of the strap 94 adjacent the conduit 81. The bolt 95 is rotated relative to the nut 96 with its end against the conduit 81 to tighten the strap around the conduit 81 and housing 88 and thereby clamp the housing 88 to the side of the conduit 81. A rubber pad 98 is positioned between the strap 94 and the side of the housing 88 opposite the conduit 81 to restrict damage to the housing 88 from the clamping pressure applied by the strap 81.

Figure 6:
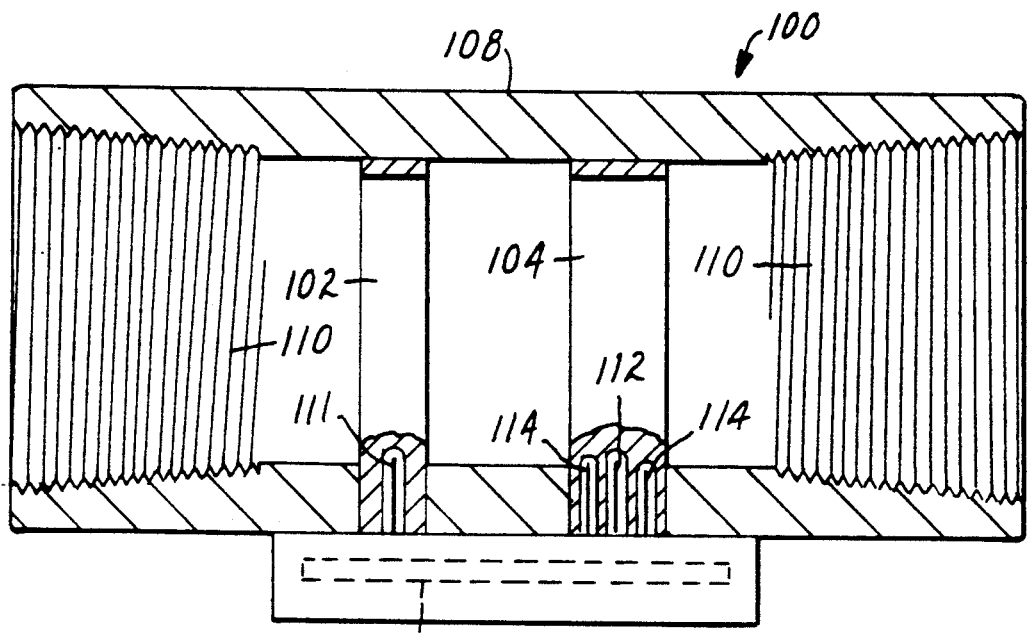
FIG. 6 is a longitudinal sectional view of a third embodiment of a liquid flow rate detector according to the present invention.

Referring now to FIG. 6 there is illustrated a third embodiment of a liquid flow rate detector 100 according to the present invention adapted for detecting whether a rate of flow for liquid flowing through a conduit is above or below a generally predetermined liquid flow rate, and for developing different control signals in response to detecting flow rates above and below that generally predetermined liquid flow rate. The flow rate detector 100 comprises first and second thermally conductive liquid contact members 102 and 104, means adapted for supporting said liquid contact members 102 and 104 for contact with the flowing liquid, and electric circuitry 106 which is essentially the same as he electrical circuitry 11 described above. The means adapted for supporting the liquid contact members 102 and 104 comprises a thermally non conductive member or polymeric pipe coupling type member 108 having an inner surface 109 defining a through passageway, and means in the form of threaded end portions 110 at its opposite ends adapted for connecting the liquid flow rate detector between portions of the conduit with the through passageway aligned with passageways in the conduit portions. The first and second thermally conductive liquid contact members 102 and 104 are attached in spaced relationship along the inner surface 109 of the thermally non conductive member 108 that defines its through passageway for contact with liquid flowing through the through passageway. As illustrated, the liquid contact members are annular rings around the inner surface 109 of the non conductive member 108, with temperature sensors 111 and 112 and heating resistors 114 corresponding to the sensors 43 and 48 and resistors 56 and 57 of the circuit 11 in bores along thickened portions thereof. Alternatively, probes similar to the probes 12 and 14 described above positioned to project radially across the non conductive member 108 could also be used.

Figure 7:
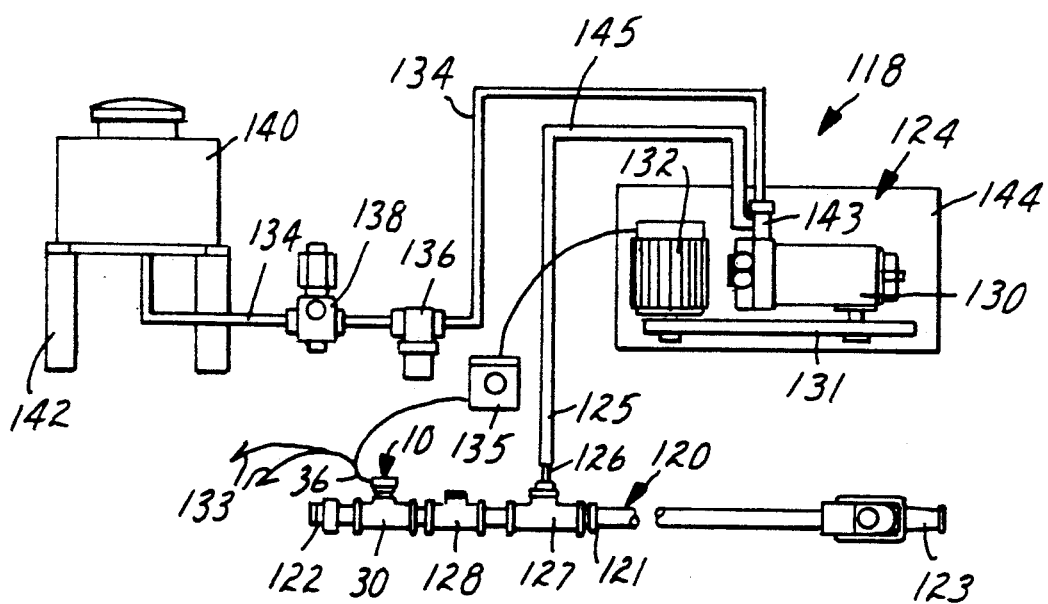
FIG. 7 is a schematic view of a system incorporating the flow rate detector according to the present invention for injecting a foam concentrate into a conduit portion.

FIG. 7 schematically illustrates a foam concentrate injection system 118 incorporating the liquid flow rate detector 10 described above. The injection system 118 includes an injection conduit portion 120 having male and female hose couplers 121 and 122 at its opposite ends so that the injection conduit portion 120 is adapted to be coupled between an inlet conduit portion (not shown) typically connected to a water supply tank on a fire truck and an outlet conduit portion terminating in a special foam generating nozzle 123 (e.g., an air aspirating foam nozzle, model SFL-1 and ½ inch available from Elkhart, Elkhart, Ind.), that is adapted to carry flowing water used to fight a fire; injection means 124 adapted for injecting foam concentrate at a metered rate into the injection conduit portion 120 through a hose 125 and an injector 126 coupled to a pipe tee 127 so that, when water is flowing through the injection conduit portion 120 and conduit portions connected thereto a foam can result at the nozzle 123 from the water and concentrate mixture that will much more efficiently extinguish the fire than water alone; and means including the flow rate detector 10 attached in the pipe tee 30 included in the injection conduit portion 120 for switching the injection means 124 to an activated state at which concentrate will be injected into the injection conduit portion 120 at the pipe tee 126 in response to a first control signal, and for switching the injection means to a deactivated state at which the concentrate will not be injected into the injection conduit portion 120 in response to a second control signal. The injection conduit portion 120 includes a conventional flow check valve 128 between the pipe tees 126 and 30 that insures that water can only flow in the direction from the pipe tee 30 toward the pipe tee 126, thereby restricting contamination of the water supply by restricting movement of any foam concentrate back toward it.

The injection means 124 adapted for injecting foam concentrate at a metered rate into the injection conduit portion 120 through the hose 125 comprises a positive displacement injection pump 130 driven through a belt 131 by a variable speed motor 132 that is activated or deactivated through the flow rate detector 10 and a manually adjustable motor speed controller 135 from a source of 12 volt power typically supplied through electrical clips 133 on the cord 36 from the 12 volt power on a fire truck to which the injection conduit portion 120 is attached. The pump 130 draws the foam concentrate from a polymeric foam concentrate supply tank 140 supported on a rectangular frame portion 142 through a supply line 134 coupled to the pump 130 through a strainer 136 that protects the pump 130 from particles and a solenoid valve 138 which is electrically connected to open when the motor 132 is operated and to close when the motor 132 is not operating to then prevent the foam concentrate from draining from the tank 140. A relief valve 143 is provided between the supply line 134 and one end of a hose 145, the other end of which hose 145 is connected to the end of the hose 125 connected to the injector 126. The relief valve 143 protects the pump 130 from over pressurization by opening when a predetermined pressure is exceeded in the hoses 125 and 145 (e.g., a condition that could result if the injector 126 were to become plugged) so that the foam concentrate being pumped can return from the injector 126 to the supply line 134 through the hose 145 and the open relief valve 143. While not illustrated, a platform 144 on which the pump 130 and motor 132 are mounted can conveniently be positioned beneath the frame portion 142 on which the tank 140 is mounted, the pump 130, motor 132, strainer 136, solenoid valve 138 and controller 135 can be positioned in the space within that frame portion 142 between the platform 144 and the tank 140, and there can further be provided protective frame portions projecting upwardly from the platform along the corners of the frame portion 142 and the tank 140 and joined together above the top of the tank 140 to provide handles for the resulting conveniently portable assembly. Preferably, the pump 130 is a positive displacement piston pump (e.g., a model 2221B pump available from Hypro Corp., New Brighton, Minn.), the motor 132 is a 12 volt D.C. variable speed motor (e.g., a model 3C-1333282C motor available from M.E.T., Mankato, Minn.); the manually adjustable speed controller 135 is of a type which allows the speed of the motor to be varied by adjusting a rotary knob on the controller 135 (e.g., a model 00100-003 controller available from Progress Instruments, Lee's Summit, Mo.), and the injector 126 is adapted for foam concentrate (e.g., a model 00400-007 injector available from C.A.P., Inc., Benson, Minn.). Such a combination, pre-calibrated to inject the foam concentrated into water flowing at 95 gallons per minute through a hose connected to the injection conduit portion 120 (i.e., a condition typically produced by a fire truck producing 100 pounds per square inch of water pressure at the inlet to the nozzle 123) can be set by adjusting the knob on the controller 135 to accurately inject Class A foamant or foam concentrate into the conduit portion 120 at a rate in the range of 0.1% to 1.0% of the rate of water flow through that hose (i.e., at a rate in the range of 0.095 to 0.95 gallons per minute).

The liquid flow rate detector according to the present invention has now been described with reference to three embodiments thereof and one embodiment of an injection system in which the flow rate detector can be incorporated. It will be apparent to those skilled in the art that many changes can be made in the embodiments described without departing from the scope of the present invention. Thus the scope of the present invention should not be limited to the structures described in detail in this application, but only by structures described by the language of the claims and the equivalents of those structures.

We claim:

1. A liquid flow rate detector adapted for detecting whether a rate of flow for liquid within a conduit is above or below a generally predetermined liquid flow rate, and for developing different control signals in response to detecting flow rates above and below said generally predetermined liquid flow rate, said detector comprising:

first and second thermally conductive liquid contact members;

means adapted for supporting said liquid contact members for contact with the liquid within the conduit; and electric circuitry including:

ambient liquid temperature sensing means coupled to said first liquid contact member for detecting the ambient temperature of liquid with which the first liquid contact member is in contact;

temperature sensing means for detecting the temperature at a portion of said second liquid contact member;

heating means including an electric heater in said second liquid contact member for supplying a limited amount of heat in an attempt to heat said portion of said second liquid contact member to a threshold temperature at least a predetermined number of degrees above the ambient temperature determined by said ambient liquid temperature sensing means; and first and second signal generating means for generating a first control signal when the temperature of said portion of said second liquid contact member is at least at said threshold temperature to detect a liquid flow rate below the predetermined liquid flow rate at which the liquid is not capable of cooling said portion of said second liquid contact member below said threshold temperature, and for generating a second signal when the temperature of said portion of said second liquid contact member is maintained below said threshold temperature to detect a liquid flow rate above the predetermined liquid flow rate at which the flowing liquid is capable of cooling said portion of said second liquid contact member below said threshold temperature.

2. A liquid flow rate detector according to claim 1 wherein said first and second thermally conductive temperature liquid contact members are metal probes having proximal and distal end portions, and said means adapted for supporting said liquid contact members engages the proximal end portions of said probes with said distal end portions projecting therefrom in a position adapted to be immersed in said flowing liquid.

3. A liquid flow rate detector according to claim 2 adapted for use with a conduit including a conventional pipe tee having an internally threaded wall defining an opening along one side, wherein said means adapted for supporting said liquid contact members comprises a housing having an axis, inner and outer axially spaced end portions, a threaded part around said axis and adjacent said inner end portion adapted for threaded sealing engagement with the internally threaded wall of the pipe tee with the inner end portion of the housing disposed inside of the tee, the proximal portions of said temperature probes are engaged by said housing with the distal ends of said probes projecting from said inner end portion, and at least a major portion of said electric circuitry is enclosed within said housing.

4. A liquid flow rate detector according to claim 2 adapted for use with a rigid conduit having openings along one side adapted to receive the distal end portion of said probes, wherein said means adapted for supporting said liquid contact members comprises
- a housing having inner and outer sides with the proximal end portions of said probes being engaged by said housing and said distal end portions of said probes projecting generally normally from said inner side, at least a major portion of said electric circuitry being enclosed within said housing;
- a gasket around said probes along said inner side and adapted for sealing engagement between said inner side of said housing and the conduit; and
- means for clamping said housing to the conduit to bring said gasket into sealing engagement therebetween.

5. A liquid flow rate detector according to claim 1 wherein said means adapted for supporting said liquid contact members comprises a thermally non conductive member having a surface defining a through passageway, and means adapted for connecting said liquid flow rate detector between portions of the conduit with said through passageway aligned with passageways in the conduit portions, and wherein said first and second thermally conductive liquid contact members are attached in spaced relationship along the surface of said thermally non conductive member defining said through passageway for contact with liquid flowing through said through passageway.

6. An injection system adapted to be coupled to a conduit adapted to carry flowing liquid;
injection means adapted for injecting a substance at a predetermined rate into the conduit;
means for switching said injection means to an activated state at which the substance will be injected into the conduit in response to a first control signal, and for switching said injection means to a deactivated state at which the substance will not be injected into the conduit in response to a second control signal;
first and second thermally conductive liquid contact members;
means for supporting said liquid contact members on the conduit with said liquid contact members in contact with liquid within the conduit;
means coupled to said first liquid contact member for detecting the ambient temperature of the liquid in contact with the first liquid contact member;
means including an electric heater for supplying a limited amount of heat in an attempt to heat a portion of said second liquid contact member to a threshold temperature at least a predetermined number of degrees above the ambient temperature determined by said means coupled to said first liquid contact member;
means for detecting the temperature of said portion of said second liquid contact member;
means for generating said first control signal when the temperature of said portion of said second liquid contact member is at least at said threshold temperature to detect a liquid flow rate below the predetermined liquid flow rate at which the liquid is not capable of cooling said portion of said second liquid contact member below said threshold temperature; and
means for generating a second signal when the temperature of said portion of said second liquid contact member is maintained below said threshold temperature to detect a liquid flow rate above the predetermined liquid flow rate at which the flowing liquid is capable of cooling said portion of said second liquid contact member below said threshold temperature.

7. A foam concentrate injection system comprising:
an injection conduit portion adapted to be coupled between inlet and outlet conduit portions adapted to carry flowing water used to fight a fire;
injection means adapted for injecting foam concentrate at a metered rate into said injection conduit portion so that a foam can result from the water and concentrate mixture that will much more efficiently extinguish the fire than water alone;
means for switching said injection means to an activated state at which concentrate will be injected into said injection conduit portion in response to a first control signal, and for switching said injection means to a deactivated state at which the concentrate will not be injected into said injection conduit portion in response to a second control signal;
first and second thermally conductive liquid contact members;
means for supporting said liquid contact members on said injection conduit portion with said liquid contact members in contact with water within the injection conduit portion;
means coupled to said first liquid contact member for detecting the ambient temperature of water with which the first liquid contact member is in contact; and
an electric circuit comprising:
first detecting means including an electric heater for supplying a limited amount of heat in an attempt to heat a portion of said second liquid contact member to a threshold temperature at least a predetermined number of degrees above the ambient temperature determined by said first detection means;

second detection means for detecting the temperature of said portion of said second liquid contact member;

means for generating said first control signal when the temperature of said portion of said second liquid contact member is at least at said threshold temperature to detect a water flow rate below the predetermined water flow rate at which the water is not capable of cooling said portion of said second liquid contact member below said threshold temperature; and means for generating a second signal when the temperature of said portion of said second liquid contact member is maintained below said threshold temperature to detect a water flow rate above the predetermined water flow rate at which the flowing water is capable of cooling said portion of said second liquid contact member below said threshold temperature.

8. A foam concentrate injection system according to claim 7 wherein said first and second thermally conductive liquid contact members are probes having proximal and distal end portions, and said means adapted for supporting said liquid contact members engages the proximal end portions of said probes with said distal end portions projecting therefrom in a position adapted to be immersed in said flowing liquid.

9. A foam concentrate injection system according to claim 8 wherein said injection conduit portion includes a conventional pipe tee having an internally threaded wall defining an opening along one side; and said means for supporting said liquid contact members comprises a housing having an axis, inner and outer axially spaced end portions, a threaded part around said axis and adjacent said inner end portion in threaded sealing engagement with the internally threaded wall of the pipe tee with the inner end portion of the housing assembly disposed inside of the tee, the proximal portions of said temperature probes are engaged by said housing assembly with the distal ends of said probes projecting from said inner end portion, and at least a portion of said circuitry is enclosed within said housing.

10. A foam concentrate injection system according to claim 8 wherein said injection conduit portion includes a rigid conduit having openings along one side adapted to receive the distal end portion of said probes; and said means adapted for supporting said temperature probes with said distal end portions immersed in said flowing liquid comprises a housing having inner and outer sides with the proximal end portions of said probes being engaged in said housing assembly and said distal end portions of said probes projecting generally normally from said inner side through the openings in said conduit, at least a portion of said circuit being enclosed within said housing assembly;

a gasket around said probes along said inner side in sealing engagement between said inner side of said housing and the conduit; and means clamping said housing to the conduit for bringing said gasket into sealing engagement therebetween.

11. A liquid flow rate detector according to claim 7 wherein said injection conduit portion comprises a thermally non conductive member having a surface defining at least a portion of a passageway through said injection conduit portion, and wherein said means adapted for supporting said liquid contact members supports said first and second liquid contact members in spaced relationship along the surface of said thermally non conductive member defining said through passageway for contact with liquid flowing through said through passageway.

12. A liquid flow rate detector according to claim 1 wherein said detector is adapted for use with water flowing through the conduit.

* * * * *